United States Patent [19]

Maenza

[11] Patent Number: 5,528,577
[45] Date of Patent: Jun. 18, 1996

[54] APPARATUS AND METHOD FOR READING AT LEAST PARTIALLY UNMETALLIZED OPTICAL DISCS

[75] Inventor: Glenn J. Maenza, Glen Mills, Pa.

[73] Assignees: Sony Corporation, Tokyo, Japan; Sony Music Entertainment, Inc., New York, N.Y.

[21] Appl. No.: 325,725

[22] Filed: Oct. 19, 1994

[51] Int. Cl.$^6$ .................................................. G11B 7/00
[52] U.S. Cl. .................. 369/116; 369/106; 369/44.25; 369/54
[58] Field of Search .................................. 369/116, 121, 369/120, 106, 112, 44.11, 44.25, 44.35, 44.36, 54

[56] References Cited

U.S. PATENT DOCUMENTS

| | | | |
|---|---|---|---|
| 4,648,085 | 3/1987 | Shimonou | 369/54 |
| 4,742,505 | 5/1988 | Takeuchi et al. | 369/106 |
| 5,128,911 | 7/1992 | Ito et al. | 369/44.36 |
| 5,148,423 | 9/1992 | Gleim | 369/44.25 |
| 5,247,501 | 9/1993 | Hashimoto et al. | 369/44.11 |
| 5,337,305 | 8/1994 | Hashima et al. | 369/116 |
| 5,353,270 | 10/1994 | Iimura | 369/54 |

OTHER PUBLICATIONS

"Deep–Dish Compact Discs," Popular Science, Sep., 1994 Leslie Lamarre, p. 46.

*Primary Examiner*—Loha Ben
*Attorney, Agent, or Firm*—Peter C. Toto; Jerry A. Miller

[57] ABSTRACT

An optical disc player adapted to read an optical disc having a plurality of pits and lands representative of information stored on the optical disc; the optical disc being at least in part unmetallized. The player includes a semiconductor laser for generating a variable power laser beam, the power of the beam being controlled by a control signal applied to a control terminal of a semiconductor laser driver. A focusing servo is provided for focusing the beam on the optical disc such that a portion of the beam is reflected back from the optical disc indicative of the pits or lands. The portion of the beam reflected back from the optical disc being substantially less from unmetallized portions of the disc than from metallized portions of the disc. The focusing servo has a focal point constrained to lock on a pit plane of the optical disc. An automatic power control component is also provided for generating the control signal in response to a comparison of an average power level of the reflected portion of the beam and a reference level so as to maintain a substantially constant average power level of the reflected portion of the beam. As such, the player is capable of playing completely unmetallized optical discs or optical discs wherein a portion of the optical disc is metallized and a portion of the optical disc is unmetallized.

26 Claims, 2 Drawing Sheets

APPARATUS AND METHOD FOR READING AT LEAST PARTIALLY UNMETALLIZED OPTICAL DISCS

BACKGROUND

1. Field of the Invention

The present invention relates to optical disc players and more particularly to optical disc players designed to read optical discs that are at least in part unmetallized.

2. Background of the Invention

FIG. 1 shows a typical optical disc 10, in this case a compact disc. In order to read this disc, light 20 is directed toward the disc and strikes from the bottom, passing through a transparent plastic layer 30. The light is generated by a semiconductor laser, e.g., a 780 nanometer aluminum, gallium-arsenide semiconductor laser. Typically, the transparent plastic layer is polycarbonate as it has the best characteristics for such use, i.e., the combination of optical characteristics, heat resistance, moisture resistance, formability, etc. A pit 40 which corresponds to the signal is shown as a depression or projection in the transparent plastic layer 30. An extremely thin metal layer 50, i.e., the metallization, follows the contour of the pits 40. The metal layer 50 is typically 0.1 micron thick and formed via sputtering techniques. The purpose of the metal layer 50 is solely to increase the reflectivity of the disc. Accordingly, aluminum is typically used for the metal layer 50 due to its high reflectivity. For a typical metallized compact disc, i.e., a compact disc including metal layer 50, the value of reflectivity for light 20 is in the neighborhood of 80 percent at the metallized aluminum—pit surface. In contrast, with an unmetallized, i.e., no metal layer 50, disc reflectivity has been shown to be in the neighborhood of 2-4 percent, i.e., light which reflects back from the pit plane.

A hard resin layer 60 is provided above the metal layer 50 to protect the signal layer of the disc. A label or other design can be silk-screened over this layer 60.

The semiconductor laser of a conventional compact disc player is included in an optical pickup. The optical pickup detects (reads) the optical signal and can be thought of as the heart of a compact disc system. In addition to the semiconductor laser, an optical pickup generally includes, among other things, photodetectors and a series of lenses. The photodetectors in turn include light sensing elements and a pre-amplification section. In typical compact disc players that employ metallized discs, the power of the beam exiting the optical pickup, or more specifically, exiting the semiconductor laser to read the disc, is in the range of 0.3 to 0.5 milliwatt incident power. The average power of the reflected light would thus be 80% of this 0.3 to 0.5 milliwatt incident power. While various servos exist to control the optical pickup, e.g., a focus servo and a tracking servo, there is no control system presently being employed in optical disc readers such as compact disc players for controlling the average power level of the reflected beam. However, such a servo may not be particularly necessary with present day systems employing uniformly metallized discs in good repair and substantially constant output semiconductor lasers having focus servos, as the 80 percent reflectivity at the metallized aluminum—pit surface results in a power level of the reflected light being sufficient to be discerned by the photodetectors of the optical pickup.

In certain applications it would be desirable to read a compact disc without a metallized layer 50. For example, as known, the production of compact discs is a multi-phase process, and each phase is subject to various problems requiring appropriate quality control. The quality controls include: glass master testing, stamper testing, metallized disc testing and finished product testing. A method of analyzing compact discs prior to the process of metallization would be a useful aid in trouble shooting the manufacturing process. For example, by determining specific parameters before and after metal is applied, a determination as to the effects of metallization could be made. However, while it is advantageous to find problems as early as possible in the manufacturing process to minimize process time, production costs and excess rejected product, in conventional compact disc manufacturing processes it is not until the step of metallized disc testing that it can be determined whether information has been properly recorded. The reason for this is because conventional compact disc players having semiconductor lasers in the range of 0.3 to 0.5 milliwatt provide insufficient power to produce a reflected light signal strong enough to be read by typical optical pickups due to the poor reflectivity of the plastic (plastic layer 30)/air (hard resin layer 60 has not yet been formed) interface (approximately 4 percent). Accordingly, there is a need for the ability to fully play and analyze a clear compact disc to provide feedback on quality immediately after molding.

Another application for an unmetallized disc would be for storing long term archival data in a format such as CD-ROM, or for long term storage of other audio or video formatted CD information. The reason an unmetallized disc would be preferable to a metallized disc is that the metallization is the only part of a compact disc possibly subject to the very long term effects of aging and environmental conditions. By storing information on a clear disc, the permanency of the record would be assured. Thus, a player for reading unmetallized compact discs would be desirable.

Finally, in certain instances it would be desirable to play a compact disc that is partially metallized and partially unmetallized. An example of such an application would be a compact disc that is damaged, i.e., part of the metal is inadvertently removed or damaged. Furthermore, it has been also claimed that severe conditions such as those found in mechanized search and rescue vehicles or other applications involving extreme environmental conditions or simply very long time periods may cause premature deterioration of part or all of the metallized layer thus rendering a disc unreadable by conventional compact disc players or CD-ROM players. In this case, the problems presented by conventional players are two-fold. First, not only do present compact disc players provide insufficient power to read the unmetallized portions of the disc, but because no means are provided for adjusting laser power in response to changes in average power of the reflected beam resulting from moving from metallized to unmetallized portions of the disc (or vice versa), such changes cannot be compensated for. Specifically, there is no fast, i.e., less than the 1.9 milliseconds of lost symbols which can be corrected by the cross interleave Reed-Solomon code ("CIRC") error correction system of typical CD players, power control servo currently employed to adjust for instantaneous changing disc conditions. Accordingly, it would be advantageous to be able to read a compact disc which is at least in part unmetallized.

SUMMARY OF THE INVENTION

The technique of the present invention utilizes a laser reader with a fast acting, wide dynamic range automatic power control that enables optical discs to be fully read regardless of the quality of the reflective disc coating. This technology applies to decoding all formats of optical discs including discs with poor quality, corroded or even no metal reflective coating.

In a first embodiment, an optical disc player is adapted to read an optical disc having a plurality of pits and lands representative of information stored on the optical disc; the optical disc being at least in part unmetallized. The player includes a semiconductor laser means for generating a variable power laser beam, the power of this beam being controlled by a control signal applied to a control terminal of a semiconductor laser means. A focusing servo is provided for focusing the beam on the optical disc such that a portion of the beam is reflected back from the optical disc. The focusing servo preferably has a focal point constrained to lock on a pit plane of the optical disc, i.e., the polycarbonate/air interface, not the air/polycarbonate interface (assuming hard resin layer 60 is not present). The portion of the beam reflected back from the optical disc is substantially less from unmetallized portions of the disc than from metallized portions of the disc due to the difference in reflectivity. A negative feedback automatic power control servo is provided for generating the control signal in response to an average power level of the reflected portion of the beam so as to maintain a substantially constant average power level of the reflected portion of the beam. As such, the player is capable of playing completely unmetallized optical discs or optical discs wherein a portion of the optical disc is metallized and a portion of the optical disc is unmetallized.

While the control signal can be used to adjust the output power of a continuous wave laser, alternatively, the control signal can be used to control the duty cycle and, therefore, the average output power of a pulsed laser via a pulse width modulator. In yet another embodiment, the detected signal can be maintained by controlling the amplifier gain of the photodetectors via the control signal. This latter method can be used in combination with one of the above methods.

Preferably, the semiconductor laser means includes a 780 nanometer laser and a laser power driver for receiving the control signal and driving the laser up to 20 milliwatts in response thereto. A CIRC decoder employing burst error correction, wherein a response time of the automatic power control servo is less than a burst error correction capability of the CIRC decoder, is also provided.

In another embodiment, a method for reading an optical disc having a plurality of pits and lands representative of information stored on the optical disc is disclosed. Again, the optical disc is at least in part unmetallized. The method includes the steps of generating a variable power laser beam in response to a control signal; focusing said beam on said optical disc such that a portion of said beam is reflected back from said optical disc indicative of the pits or lands, the portion of said beam reflected back from said optical disc being substantially less from unmetallized portions of said optical disc than from metallized portions of said optical disc; detecting said portion of said beam reflected back from the optical disc; and generating said control signal in response to an average power level of the reflected portion of said beam so as to maintain a substantially constant average power level of the reflected portion of said beam.

DETAILED DESCRIPTION OF THE INVENTION

Figure 2:
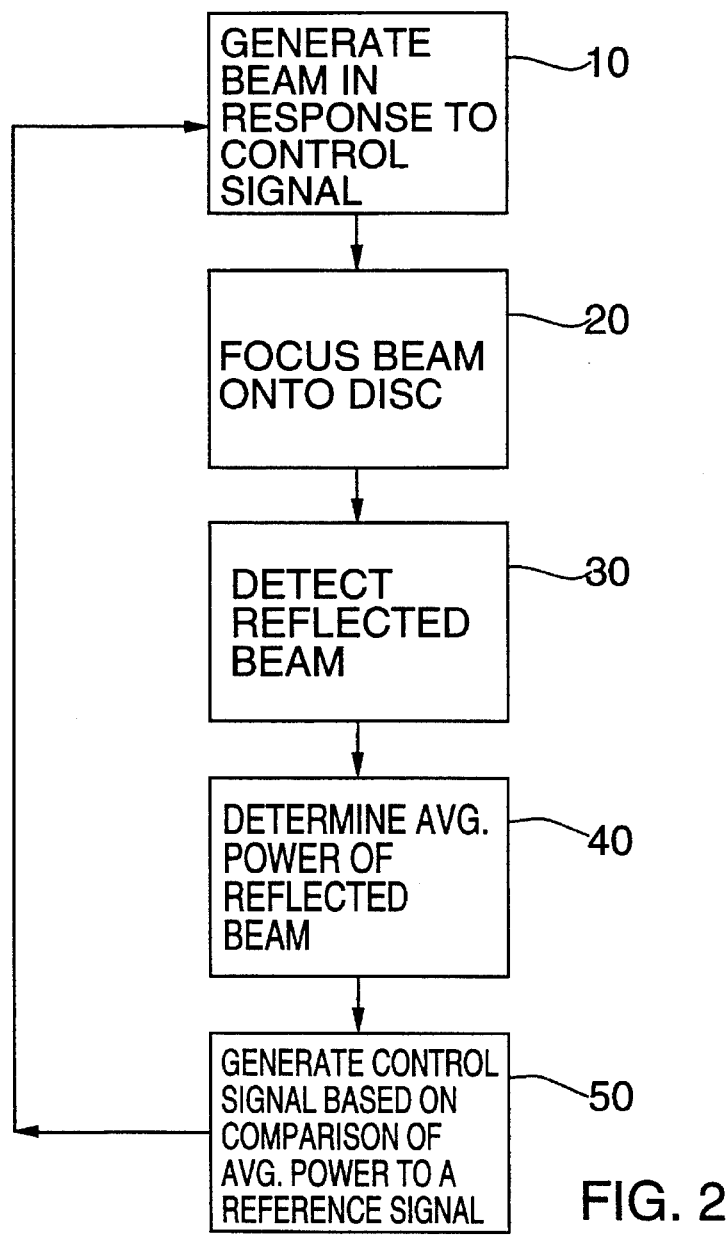
FIG. 2 is a block diagram of the steps for reading a compact disc which is at least in part unmetallized.

FIG. 2 shows the processing steps in accord with a preferred embodiment of the present invention. In step 10, a variable power laser beam is generated. The beam is generated by a laser and the power of the beam is controlled by a control signal applied to a control terminal of a laser power driver coupled to or integral with the laser. Preferably, the laser is a 780 nanometer continuous wave, semiconductor laser, and the laser power driver is used to achieve a maximum power of at least approximately 15 to 20 milliwatts optical power. The power of the laser is variable from approximately 0.3 to 20 milliwatts. Individual lasers and laser power drivers of this type are well-known by those skilled in the art, however, they have not been combined for use in such applications as described herein in the past. In step 20, the beam is focused onto the optical disc and a reflected beam results. In step 30, the reflected laser beam is detected by photodetector means which include a preamplification section in addition to light sensing elements. The photodetector means produces an instantaneous output representative of the incident light. As described above, the reflectivity of metallized, e.g., aluminum coated, optical discs is approximately 80 percent. In contrast, the reflectivity of unmetallized portions of the disc is approximately 2–4 percent. Advantageously, the optical disc player of the present invention is adapted to read a disc which is at least in part unmetallized.

In step 40 the average power of the reflected beam is determined. This can be accomplished in conventional fashion by low pass filtering or peak detecting the instantaneous output of the photodetectors. Because of the difference in reflectivity when unmetallized portions of the optical disc are read compared to when metallized portions of the disc are read, the intensity or average power of the reflected beam will be in the order of 20–40 times greater from metallized portions than the intensity or average power of the reflected beam from unmetallized portions of the optical disc. To respond to this change in the average power of the reflected beam, in step 50 a control signal is generated by an automatic power control servo that compares the average power of the reflected beam to a reference level via a differential amplifier, for example. The output of the automatic power control servo is the control signal. The control signal tells the laser or the laser power driver to increase power in the case where the average power of the reflected beam is relatively low, indicating that unmetallized portions of the disc are being read, and to decrease power in the case where the average power of the reflected beam is relatively high, indicating that metallized portions of the disc are being read. In this fashion, the average power of the reflected beam is maintained substantially constant. Furthermore, via this arrangement, the system is able to compensate for any state between completely metallized and completely unmetallized.

Alternatively, the laser of the present invention can be pulsed, i.e., generating pulses having a fixed power profile; the average power level of the beam being determined by a variable duty cycle of the pulses. In this embodiment, the control signal can be fed to a pulse width modulator which produces an output determining the duty cycle of the laser. For example, if the power level of the pulses is set at 20 milliwatts, during unmetallized portions of the disc where 10 milliwatts average power is required, the laser would be required to run at a 50% duty cycle. When metallized portions of a disc are encountered, the duty cycle would be reduced to approximately 1.67% or 1/30th of the duty cycle for unmetallized portions as only 1/30th of the power is necessary (approximately 10 milliwatts to 0.3 milliwatt).

As yet another alternative, the gain of the pre-amplifier section of the photodetector can be controlled to maintain the detected level of the reflected beam constant. This method would be most appropriate in combination with one of the other two power control modes mentioned above, i.e., pulsed or continuous wave.

As also described in more detail below, the response time of the control signal to changing disc conditions (metallized to unmetallized) must be less than the burst error correction capability of the CIRC decoder, i.e., 450 symbols or 1.9 milliseconds. In this fashion, the adjustment of laser power to changing disc conditions is for all practical purposes instantaneous.

Figure 3:
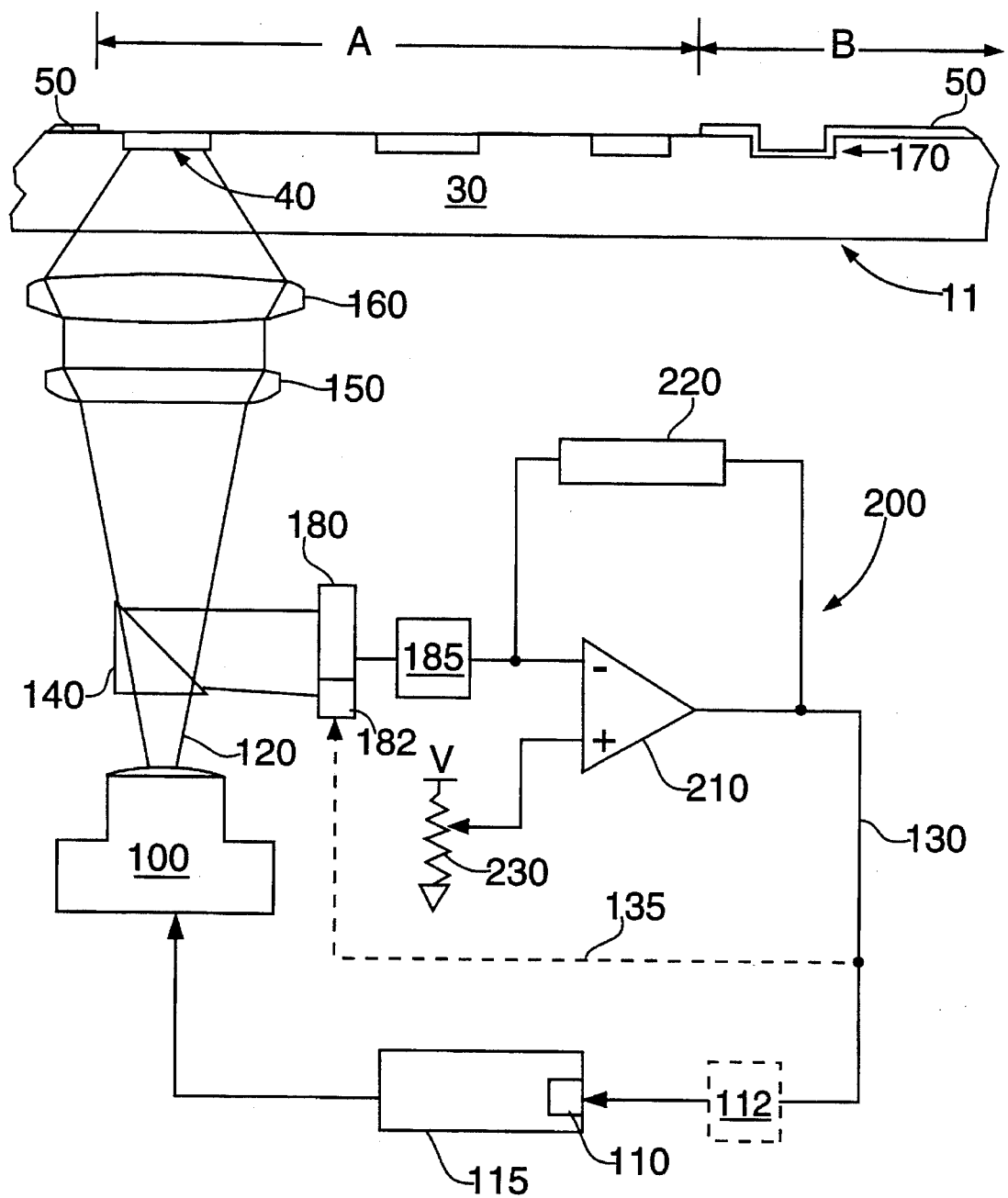
FIG. 3 is a representation of an arrangement used to read a compact disc which is at least in part unmetallized in accord with the present invention.

FIG. 3 shows a compact disc player for reading optical discs which are at least in part unmetallized in accord with the present invention. Like numbers correspond to like elements is FIG. 1. In FIG. 3, numerous components of the optical pickup as well as other servo and control systems have been omitted for purposes of clarity. However, these are all within the purview of one of ordinary skill in the art. Furthermore, the protective layer 60 has also been omitted from the disc as it need not be present to embody the present invention.

Figure 1:
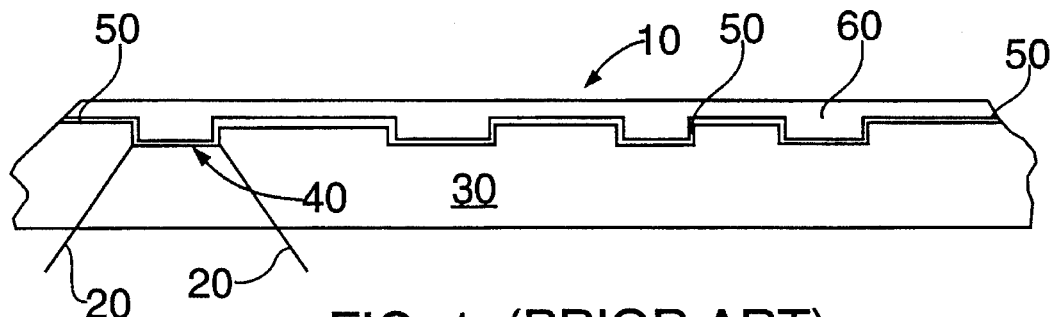
FIG. 1 is a cross sectional view of a conventional compact disc.

FIG. 3 shows an optical disc 11 which is identical to the optical disc 10 of FIG. 1 except that a portion of the metallization 50 in region A has been removed, damaged or worn off. As such, typical compact disc players and CD-ROM drives would not be capable of reading the disc 11 in this unmetallized region A as the power level of the reflected beam is simply insufficient for proper detection and no means for compensating for a change from a metallized region B to an unmetallized region A is provided. Advantageously, not only is the present invention adapted to read unmetallized portions of the disc such as that shown in region A of FIG. 3, but the present invention is also adapted to switch from reading unmetallized portions of the disc such as region A to reading metallized portions of the disc such as region B nearly instantaneously.

The components of the present invention include a variable power semiconductor laser 100. The semiconductor laser 100 is typically a 780 nanometer continuous wave laser adapted to generate a variable output 120. The output is variable over the range of approximately 0.3 to 20 milliwatts. Reaching power levels into the 20 milliwatt range is facilitated by a laser power driver 115. The power of the semiconductor laser 100 is varied based on a control signal 130 applied to a control terminal 110 of the laser power driver 115 which in turn drives the semiconductor laser 100. The laser power driver 115 may be a component separate from the laser 100, e.g., a chip, or may be integral with the laser 100. Generation of the control signal 130 is described in more detail below.

The generated laser beam 120 first passes through a prism or beam splitter 140 unaffected (the prism 140 is arranged to act only on the reflected wave). The beam next passes through a collimator lens 150 whereby it is transformed to parallel light. This parallel light is incident to an objective lens 160 which focuses the light onto a pit plane 170.

In a conventional compact disc, where there are pits 40 in the optical disc 30, the light is diffracted by the pits and goes out of the field of the objective lens 160. On the other hand, where there are no pits, almost all of the light (80%) is returned (in the case of metallized discs). Additionally, because of the coding technique used by compact disc players, there is a substantially equivalent number of pits and lands on a disc. Thus, the average reflected power of a conventional compact disc remains relatively constant over time.

When a disc such as disc 11 is considered, the average power of the reflected beam drops substantially in the unmetallized region A due to the loss of reflectivity provided by the metal. Specifically, on average only 2–4 percent of the beam is reflected back in the case of an unmetallized portion of a disc. In accord with the present invention, this returning beam is reflected by prism 140 onto a photodetector 180 which produces an electrical output representative of the light energy. In addition to containing light sensing elements, the photodetector 180 can also contain a preamplifier section for 182 controlling its gain. The output of the photodetector 180 is detected in conventional fashion by a detector 185, e.g., low pass filtered or peak detected. The output of the detector 185 is provided to a negative feedback automatic power control servo 200 which includes differential amplifier 210, a compensation network 220 and a power reference 230. The compensation network 220 is provided for servo stability and can be a phase lead/lag type network. Of course, numerous other equivalent arrangements well-known by those skilled in the art could be employed. The servo 200 functions in conventional fashion by "looking" at the input terminals of the amplifier 210 (the power reference 230 and the output of the detector 185) and swinging the output terminal around so that negative feedback brings the input difference to zero. The output of the amplifier 210 is applied to the control terminal 110 of the laser power driver 115 of the type well known by those skilled in the art via line 130 as a control signal. The laser power driver 115 in turn drives the laser 100. The semiconductor laser 100 alone or in combination with the laser power driver 115 may simply be referred to as a semiconductor laser means.

Because the power servo of the present invention is arranged to maintain the average output power of the reflected beam at a constant level, the control signal causes about a 20–40 fold increase in the output power of the laser 100 when unmetallized portions of the disc are encountered. As noted above, while laser power drivers of the type shown in the present invention are known, such powerful devices are not found in conventional compact disc players, but are needed to achieve the power requirements of the present invention.

In an alternative embodiment of the present invention, the semiconductor laser 100 is a pulsed laser (compared to the continuous wave laser described above) which generates pulses at a rate sufficient to satisfy the Nyquist criterion considering the optical transfer function of the system and having a predetermined power level but a variable duty cycle. Thus, for example, if the maximum average laser output power required to read an unmetallized region A is 10 milliwatts, the peak power level of the pulses (assuming square wave pulses) must be at least 20 milliwatts if a 50% duty cycle for unmetallized regions is desired, since at such a duty cycle the 20 milliwatt pulses will produce 10 milliwatts of average power. When metallized portions of the disc are encountered, the duty cycle of these 20 milliwatt pulses will be reduced to approximately 1.67% to provide the 0.3 milliwatt average output power required to read such metallized portions. To implement such an embodiment, a pulse width modulator 112 (shown in dotted lines to indicate that it is only present when a pulsed laser is employed) can be employed to receive the output of the amplifier 210, i.e., the control signal, via line 130 and supply the laser power driver with a signal turning it on and off at the appropriate duty cycle. The pulse width modulator 112 can also be thought of as part of the semiconductor laser means.

Finally, the control signal can optionally also be supplied to the photodetector 180 as indicated by the dotted line 135. In this case, the control signal is used to control the preamplifier section 182 of the photodetectors 180; increasing its gain during unmetallized portions and decreasing its gain during metallized portions. Typically, control of the preamplifier section 182 of the photodetectors 180 will be used in combination with one of the two methods described above.

The automatic power control circuit acts to adjust the laser level such that the reflected energy from the disc remains constant and must have a response time less than the burst error correction capability of the CIRC decoder. For 450 symbols or 1.9 milliseconds at a 1.25 meters/second scan velocity, that is equivalent to a 2.38 millimeter long defect.

Because a feedback loop of quick response time is provided in the automatic power control circuit, any level of reflectivity between completely metallized and completely unmetallized can be facilitated by the present invention.

Mechanical and optical alignment of the modified laser assembly in accord with the present invention is extremely critical to produce the necessary diffraction limited 0.9 micron scanning laser spot at the required power.

Importantly, another factor to be considered in playing a partially unmetallized disc is the performance of the focus servo (not shown in FIG. 3). It is essential that the servo be constrained to lock to the pit plane 170 and not the mirror surface (underside of 30 where light enters) of the disc. Thus, it is necessary to insure that the focus servo offset be adjusted properly to force the objective to focus at the pit plane.

Advantageously, the present invention can be used to fully play back plastic molded optical discs with no additional reflective layer required. This can be used for quality control in a compact disc manufacturing process and provides a particularly useful way of determining whether metallization is the cause of a given problem. The specific quality control tests include testing unmetallized compact disc for block error rate, burst error, interpolations, radial noise and high frequency parameters in order to diagnose manufacturing problems and the like. In fact, with sufficient power, the high frequency signal retrieved from unmetallized discs is useful to perform all tests normally performed on metallized discs.

Also, in the case of CD ROM archival discs, completely unmetallized discs can be employed. This would obviate any adverse effects to the discs caused by the metallization layer. Finally, standard metallized discs which are damaged so that part of the metallization is removed can easily be played in the compact disc player of the present invention.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. An optical disc player adapted to read an optical disc being at least in part unmetallized and having a plurality of pits and lands representative of information stored on said optical disc, comprising:

semiconductor laser means for generating a variable power laser beam, the power of said beam being controlled by a control signal applied to a control terminal of said semiconductor laser means;

focusing means for focusing said beam on said optical disc such that a portion of said beam is reflected back from said optical disc indicative of the pits or lands, an average power level of the portion of said beam reflected back from said optical disc being substantially less from unmetallized portions of said optical disc than from metallized portions of said optical disc at a given laser power;

a photodetector for receiving the portion of said beam reflected back from said optical disc and for generating an electrical signal representative thereof;

detector means for receiving said electrical signal and for generating an output signal indicative of the average power level of the portion of said beam reflected back from said optical disk; and control means for generating said control signal in response to the output signal so as to maintain a substantially constant average power level of the reflected portion of said beam.

2. The optical disc player of claim 1 wherein a portion of said optical disc is metallized and a portion of said optical disc is unmetallized.

3. The optical disc player of claim 1 wherein the power level of said semiconductor laser means is variable up to at least twenty milliwatts.

4. The optical disc player of claim 1 wherein said semiconductor laser means includes a 780 nanometer laser diode.

5. The optical disc player of claim 4 wherein said semiconductor laser means includes a laser power driver for driving said semiconductor laser in response to said control signal.

6. The optical disc player of claim 1 wherein said control means includes automatic power control means for producing said control signal as a result of a comparison between the output signal and a reference signal.

7. The optical disc player of claim 6 wherein the automatic power control means employs a negative feedback amplifier and wherein the output signal is applied to a negative terminal of said amplifier and said reference signal is applied to a positive terminal of said amplifier.

8. The optical disc player of claim 6 wherein said semiconductor laser means includes a continuous wave semiconductor laser and a laser power driver having said control terminal for driving said semiconductor laser in response to said control signal.

9. The optical disc player of claim 8 wherein said photodetector includes variable gain pre-amplifier means for controlling a gain of said electrical signal in response to said control signal.

10. The optical disc player of claim 6 wherein said semiconductor laser means includes a pulsed semiconductor laser for producing individual pulses of a substantially constant power level, a duty cycle of said pulses being variable to vary the power of said beam, said semiconductor laser means further including pulse width modulation means for receiving said control signal and generating an output in response thereto to vary said duty cycle.

11. The optical disc player of claim 10 wherein said photodetector includes variable gain pre-amplifier means for controlling a gain of said electrical signal in response to said control signal.

12. The optical disc player of claim 1 wherein said optical disc is a CD-ROM formatted optical disc.

13. The optical disc player of claim 1 wherein said focusing means includes a focusing servo having a focal point constrained to lock to a pit plane of said optical disc.

14. An optical disc system comprising:
   an optical disc having a plurality of pits and lands representative of information stored on said optical disc, said optical disc being in part unmetallized and in part metallized;
   semiconductor laser means for generating a variable power laser beam, the power of said beam being controlled by a control signal applied to a control terminal of said semiconductor laser means;
   focusing means for focusing said beam on said optical disc such that a portion of said beam is reflected back from said optical disc indicative of the pits or lands, an average power level of the portion of said beam reflected back from said optical disc being substantially less from unmetallized portions of said optical disc than from metallized portions of said optical disc at a given laser power;
   a photodetector for receiving the portion of said beam reflected back from said optical disc and for generating an electrical signal representative thereof;
   detector means for receiving said electrical signal and for generating an output signal indicative of the average power level of the portion of said beam reflected back from said optical disk; and
   control means for generating said control signal in response to the output signal so as to maintain a substantially constant average power level of the reflected portion of said beam.

15. The optical disc system of claim 14 wherein said semiconductor laser means includes a pulsed semiconductor laser for producing individual pulses of a substantially constant power level, a duty cycle of said pulses being variable to vary the power of said beam, said semiconductor laser means further including pulse width modulation means for receiving said control signal and generating an output in response thereto to vary said duty cycle.

16. A method for reading an optical disc having a plurality of pits and lands representative of information stored on said optical disc, said optical disc being at least in part unmetallized, comprising the steps of:
   generating a variable power laser beam in response to a control signal;
   focusing said beam on said optical disc such that a portion of said beam is reflected back from said optical disc indicative of the pits or lands, an average power level of the portion of said beam reflected back from said optical disc being substantially less from metallized portions of said optical disc than from metallized portions of said optical disc at a given laser power;
   detecting said portion of said beam reflected back from said optical disc and generating an electrical signal representative thereof;
   generating an output signal indicative of the average power level of the portion of said beam reflected back from said optical disc in response to said electrical signal; and
   generating said control signal in response to said output signal so as to maintain a substantially constant average power level of the reflected portion of said beam.

17. The method of claim 16 wherein said optical disc is in part metallized and in part unmetallized.

18. The method of claim 16 further comprising a pulsed semiconductor laser for generating said variable power laser beam, said beam having individual pulses of a substantially constant power level, a duty cycle of said pulses being variable to vary the power of said beam, and further including pulse width modulation means for receiving said control signal and generating an output in response thereto to vary said duty cycle.

19. The method of claim 16 further comprising photodetector means including variable gain pre-amplifier means for detecting said portion of said beam reflected back from said optical disc, said variable gain pre-amplifier means adapted to receive said control signal and adjust gain in response thereto.

20. An optical disc player adapted to read an optical disc being at least in part unmetallized and having a plurality of pits and lands representative of information stored on said optical disc, comprising:
   semiconductor laser means for generating a variable power laser beam, the power of said beam being controlled by a control signal applied to a control terminal of said semiconductor laser means;
   focusing means for focusing said beam on said optical disc such that a portion of said beam is reflected back from said optical disc indicative of the pits or lands, a peak power level of the portion of said beam reflected back from said optical disc being substantially less from unmetallized portions of said optical disc than from metallized portions of said optical disc at a given laser power;
   detector means for receiving the portion of said beam reflected back from said optical disc and for generating an output signal indicative of the peak power level of the portion of said beam reflected back from said optical disc; and
   control means for generating said control signal in response to the output signal so as to maintain a substantially constant peak power level of the reflected portion of said beam.

21. The optical disc player of claim 20 wherein a portion of said optical disc is metallized and a portion of said optical disc is unmetallized.

22. The optical disc player of claim 20 wherein said control means includes automatic power control means for producing said control signal as a result of a comparison between the output signal and a reference signal.

23. The optical disc player of claim 22 wherein the automatic power control means employs a negative feedback amplifier and wherein the output signal is applied to a negative terminal of said amplifier and said reference signal is applied to a positive terminal of said amplifier.

24. The optical disc player of claim 22 wherein said semiconductor laser means includes a continuous wave semiconductor laser and a laser power driver having said control terminal for driving said semiconductor laser in response to said control signal.

25. The optical disc player of claim 20 wherein said detector means includes a photodetector for receiving the portion of said beam reflected back from said optical disc and for generating an electrical signal representative thereof.

26. The optical disc player of claim 25 wherein said detector means further includes a peak detector for receiving the electrical signal and generating the output signal in response thereto.

* * * * *